US008555007B2

(12) United States Patent
Dematapitiya

(10) Patent No.: US 8,555,007 B2
(45) Date of Patent: Oct. 8, 2013

(54) STORAGE SYSTEM WITH JOURNAL DISKS DYNAMICALLY ASSIGNED

(75) Inventor: Sumudu Dematapitiya, Tokyo (JP)

(73) Assignee: NEC Corporation, Tokyo (JP)

( * ) Notice: Subject to any disclaimer, the term of this patent is extended or adjusted under 35 U.S.C. 154(b) by 37 days.

(21) Appl. No.: 13/147,670

(22) PCT Filed: Aug. 20, 2009

(86) PCT No.: PCT/JP2009/003963
§ 371 (c)(1),
(2), (4) Date: Aug. 3, 2011

(87) PCT Pub. No.: WO2010/092634
PCT Pub. Date: Aug. 19, 2010

(65) Prior Publication Data
US 2011/0296126 A1    Dec. 1, 2011

(30) Foreign Application Priority Data

Feb. 16, 2009  (JP) .................................. 2009-32335

(51) Int. Cl.
*G06F 12/16* (2006.01)

(52) U.S. Cl.
USPC ........................... 711/156; 711/114; 711/161

(58) Field of Classification Search
USPC ................................................ 711/156, 114
See application file for complete search history.

(56) References Cited

U.S. PATENT DOCUMENTS 5,778,393 A * 7/1998 Blea et al. ..................... 707/700
5,787,242 A * 7/1998 DeKoning et al. ........... 714/5.11
2006/0069861 A1 * 3/2006 Amano .......................... 711/114
2006/0242452 A1 * 10/2006 Kaiya et al. ....................... 714/2
2008/0201391 A1 * 8/2008 Arakawa et al. .............. 707/205

FOREIGN PATENT DOCUMENTS

| JP | 2-54346 A | 2/1990 |
| JP | 9-282211 A | 10/1997 |
| JP | 11-053235 A | 2/1999 |
| JP | 2001184176 A | 7/2001 |
| JP | 2004-287648 A | 10/2004 |
| JP | 2005235171 A | 9/2005 |
| JP | 2007286860 A | 11/2007 |

OTHER PUBLICATIONS

International Search Report for PCT/JP2009/003963 mailed Nov. 24, 2009.
Japanese Office Action for JP 2009-032335 mailed on May 21, 2013 with English Translation.

* cited by examiner

*Primary Examiner* — Hashem Farrokh
*Assistant Examiner* — Tian-Pong Chang

(57) ABSTRACT

A storage system includes a plurality of storing unit and a data processing unit configured to store data into the plurality of storing unit. The data processing unit includes: a storage destination setting unit configured to set a journal storing unit configured to store a journal showing a data processing status of the storage system from among the plurality of storing unit, and set the plurality of storing unit other than the set journal storing unit as fragment storing unit configured to distributedly store a plurality of fragment data forming storage target data, respectively; and a distribution storage controlling unit configured to store the journal into the storing unit set as the journal storing unit by the storage destination setting unit, and distribute and store the plurality of fragment data into the plurality of storing unit set as the fragment storing unit, respectively.

8 Claims, 13 Drawing Sheets

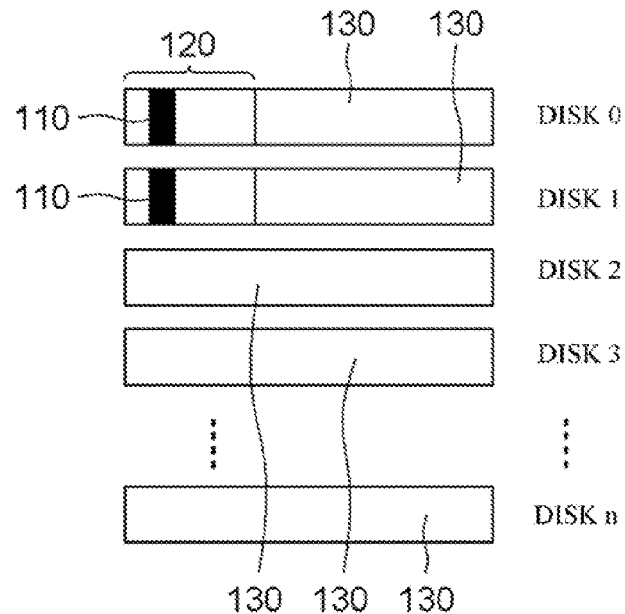
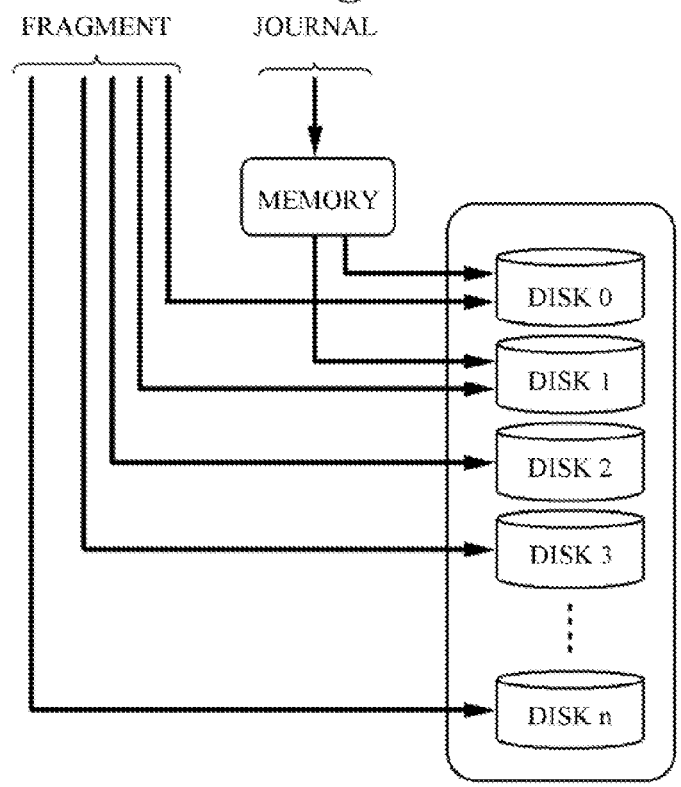

Fig.10

| DISK NUMBER | DATA/JOURNAL | AVAILABLE DATA REGION |
|---|---|---|
| DISK 0 | FOR WRITING DATA | D0 |
| DISK 1 | FOR WRITING DATA | D1 |
| DISK 2 | FOR WRITING JOURNAL | D2 |
| DISK 3 | FOR WRITING DATA | D3 |
| DISK 4 | FOR WRITING DATA | D4 |
| . . | FOR WRITING DATA | . . |
| . . | FOR WRITING DATA | . . |
| DISK n | FOR WRITING DATA | Dn |

STORAGE SYSTEM WITH JOURNAL DISKS DYNAMICALLY ASSIGNED

TECHNICAL FIELD

The present invention relates to a storage system, and specifically, relates to a storage system that distributes and stores data into a plurality of storage devices.

BACKGROUND ART

In recent years, as computers have developed and become popular, various kinds of information are put into digital data. As a device for storing such digital data, there is a storage device such as a magnetic tape and a magnetic disk. Because data to be stored has increased day by day and the amount thereof has become huge, a high-capacity storage system is required. Moreover, it is required to keep reliability while reducing the cost for storage devices. In addition, it is required that data can be easily retrieved later. As a result, such a storage system is desired that is capable of automatically realizing increase of the storage capacity and performance thereof, that eliminates a duplicate of storage to reduce the cost for storage, and that has high redundancy.

Under such circumstances, in recent years, a content address storage system has been developed as shown in Patent Document 1. This content address storage system distributes data and stores into a plurality of storage devices, and specifies a storing position in which the data is stored based on a unique content address specified corresponding to the content of the data.

To be specific, in the content address storage system, as shown in FIG. 1, a division unit 101 of a storage server 100 divides a data block that is storage target data into a plurality of fragments, and also adds a fragment that is redundant data thereto. Then, the division unit 101 stores the plurality of fragments into a plurality of storage devices such as a storage device 102 within the storage server 100 and storage devices 103 and 104 included in other storage servers. Later, by designating a content address, it is possible to retrieve data, namely, a fragment stored in a storing position specified by the content address and restore predetermined data before divided from the plurality of fragments.

Further, the content address is generated so as to be unique corresponding to the content of data. Therefore, in the case of duplicated data, it is possible to acquire data having the same content with reference to data in the same storing position. Thus, it is not necessary to separately store duplicated data, and it is possible to eliminate duplicated recording and reduce the data capacity.

Then, in the case of writing two or more pieces of fragment data (referred to as a "fragment" hereinafter) divided from one data block into one server, in order to keep the tolerance to disk fault, the storage system as described above distributes and stores the two or more fragments into the respective disks so as not to write the two or more fragments into one disk. On the other hand, when it is necessary to write two or more fragments that belong to different data blocks into one disk, the storage system makes a queue of the fragments waiting for being written and then writes in. The storage system executes a process of writing the fragment or the fragments from the queue into the disk by transaction processing, and records data representing a status of the transaction processing as a journal.

FIG. 2 shows an aspect of storing the status of the transaction processing described above as a journal. As shown in this drawing, a journal (J) is configured by a start entry written immediately before the writing of data (D) starts, a commit entry written immediately after the writing of the data ends, and a deletion entry for the used start/commit entries.

Then, for keeping redundancy, a journal 110 as described above is fixedly placed within OS (Operating System) regions 120 of disk regions configuring hardware RAID (Redundant Arrays of Inexpensive Disks) as shown in FIG. 3. In other words, the journal is placed within the OS regions 120 duplicated in two disks. As a related art, Patent Document 2 describes a technique of switching a file for storing a journal when a space for storing the journal is not available any more.

On the other hand, in order to maximize the utilization of a disk capacity, it is necessary to use each of the remaining capacities of the disks (disk 0, disk 1) including the OS regions 120 as a data region 130. This is critically important because an OS region is relatively small in a disk, which has become high-capacity nowadays. Therefore, it is necessary to provide a disk including the OS region 120 and other disks, namely, all disks (disk 0 to disk n) with data regions 130 for storing data.

[Patent Document 1] Japanese Unexamined Patent Application Publication No. JP-A 2005-235171
[Patent Document 2] Japanese Unexamined Patent Application Publication No. JP-A 1990-54346

However, in the case of distributing and storing storage target data like fragment data into the disks having the OS regions 120 as well, there is a problem that the writing performance of the storage system decreases. To be specific, as shown in FIG. 4, in a case that fragment data are stored into the disks having the OS regions, the fragment data and the journal are stored into the same disks (disk 0 and disk 1). This causes contention of the writing process in the disks, delays the writing, and delays completion of the writing of the original data block having been fragmented. As a result, the problem of decrease of the writing performance arises. Moreover, in the event of a disk failure, both the data and the journal may be lost, and therefore, a problem of decrease of reliability also arises.

SUMMARY

Accordingly, an object of the present invention is to provide a storage system capable of realizing increase of writing performance while realizing increase of redundancy, which is the aforementioned task.

In order to achieve the object, a storage system of an embodiment of the present invention includes a plurality of storing means and a data processing means configured to store data into the plurality of storing means.

Then, the data processing means includes: a storage destination setting means configured to set a journal storing means configured to store a journal showing a data processing status of the storage system from among the plurality of storing means, and set the plurality of storing means other than the set journal storing means as fragment storing means configured to distributedly store a plurality of fragment data forming storage target data, respectively; and a distribution storage controlling means configured to store the journal into the storing means set as the journal storing means by the storage destination setting means, and distribute and store the plurality of fragment data into the plurality of storing means set as the fragment storing means, respectively.

Further, a computer program of another embodiment of the present invention is a computer program comprising instructions for causing an information processing device equipped with a plurality of storing means to realize a data processing means configured to store data into the plurality of storing means.

Then, the data processing means includes: a storage destination setting means configured to set a journal storing means configured to store a journal showing a data processing status of the storage system from among the plurality of storing means, and set the plurality of storing means other than the set journal storing means as fragment storing means configured to distributedly store a plurality of fragment data forming storage target data, respectively; and a distribution storage controlling means configured to store the journal into the storing means set as the journal storing means by the storage destination setting means, and distribute and store the plurality of fragment data into the plurality of storing means set as the fragment storing means, respectively.

Further, a data processing method of another embodiment of the present invention is a data processing method including, when a storage system equipped with a plurality of storing means stores data into the plurality of storing means: setting a journal storing means configured to store a journal showing a data processing status of the storage system from among the plurality of storing means, and setting the plurality of storing means other than the set journal storing means as fragment storing means configured to distributedly store a plurality of fragment data forming storage target data, respectively; and storing the journal into the storing means set as the journal storing means, and distributing and storing the plurality of fragment data into the plurality of storing means set as the fragment storing means, respectively.

With the configurations as described above, the present invention can realize increase of writing performance while realizing increase of redundancy of stored data in a storage system.

BRIEF DESCRIPTION OF DRAWINGS

FIG. 3 is a view showing a configuration of disks in the storage system relating to the present invention;

FIG. 4 is a view showing an aspect of recording of fragment data and a journal in the storage system relating to the present invention;

FIG. 10 is a view showing an example of data stored in the storage system;

EXEMPLARY EMBODIMENTS

First Exemplary Embodiment

Figure 1:
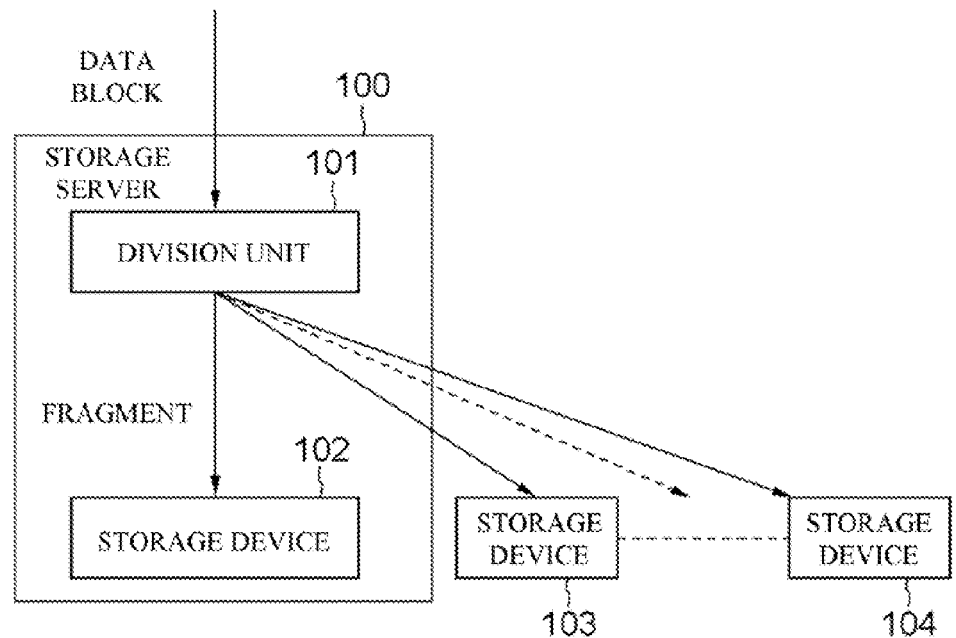
FIG. 1 is a diagram showing an aspect of recording of data in a storage system relating to the present invention.
Figure 2:
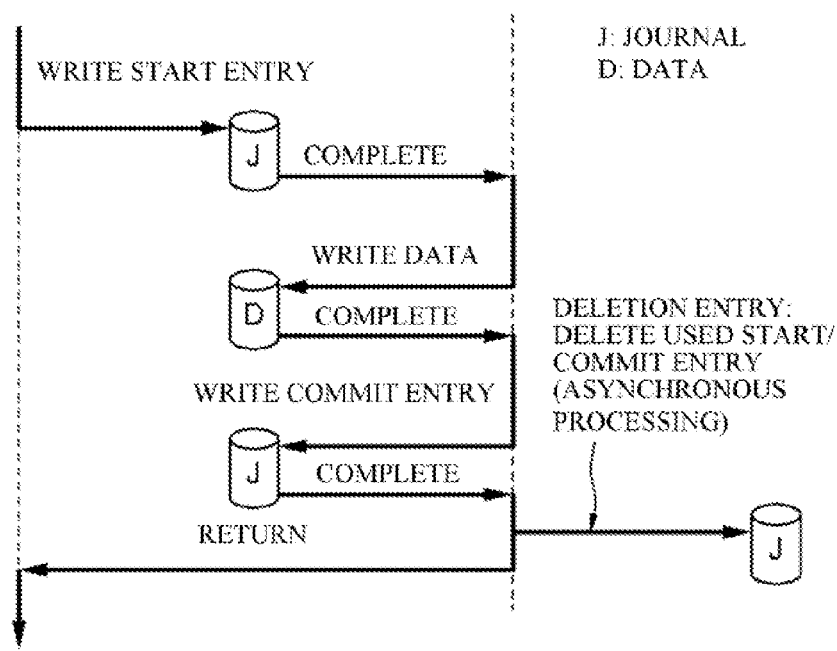
FIG. 2 is a view showing an aspect of storage of a journal in the storage system relating to the present invention.
Figure 5:
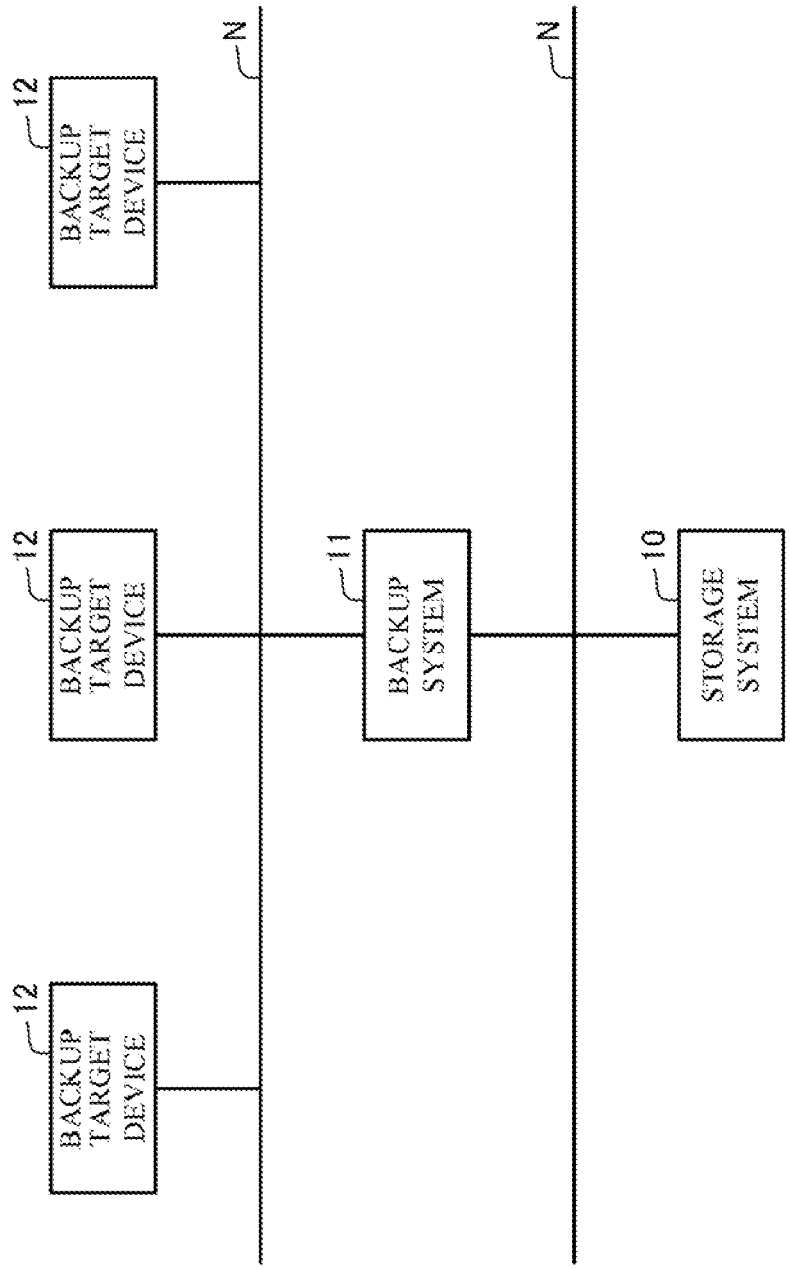
FIG. 5 is a block diagram showing a configuration of a whole system in a first exemplary embodiment of the present invention.
Figure 6:
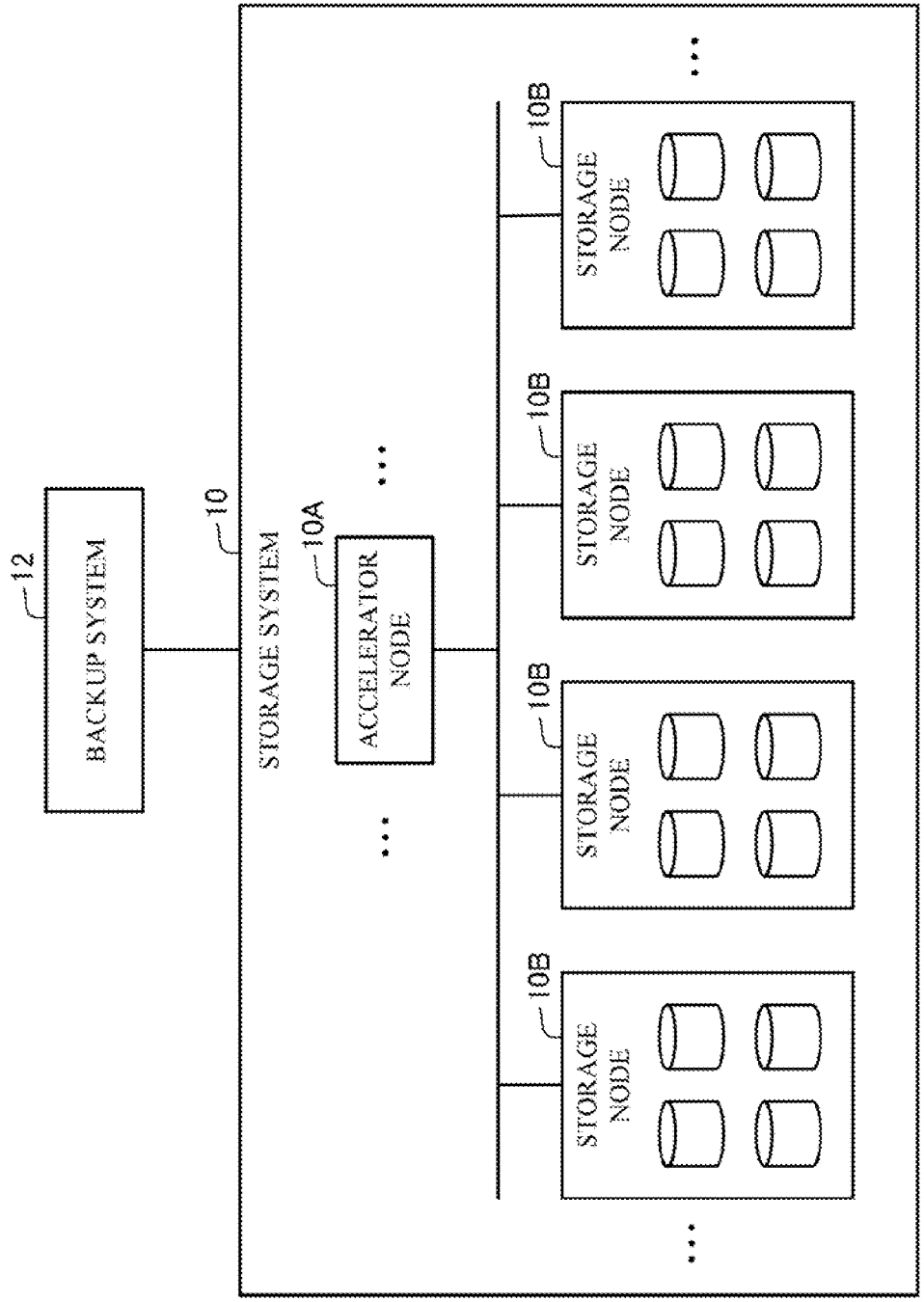
FIG. 6 is a block diagram schematically showing a storage system in the first exemplary embodiment of the present invention.
Figure 7:
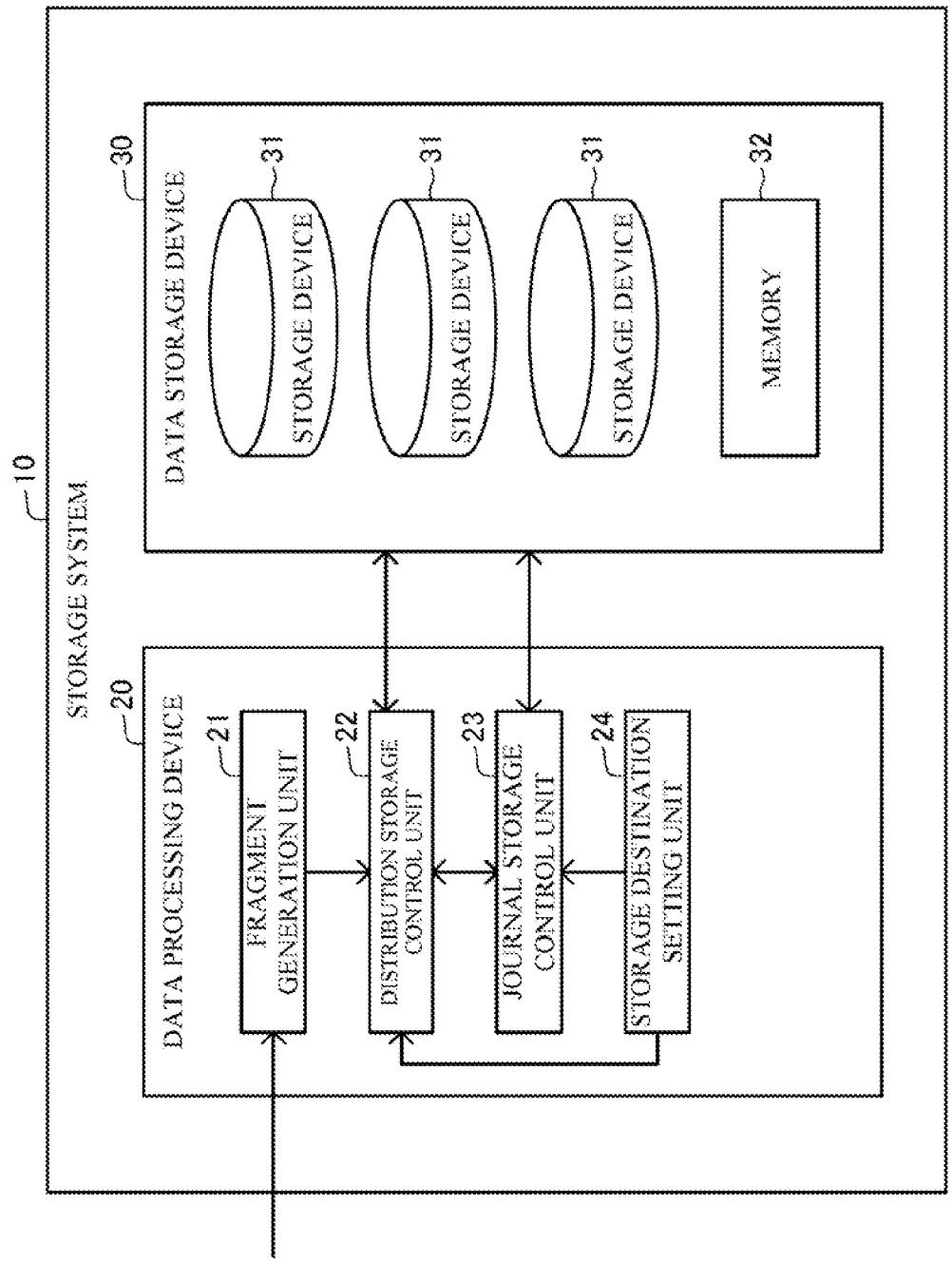
FIG. 7 is a function block diagram showing a configuration of the storage system disclosed in FIG. 6.
Figure 8:
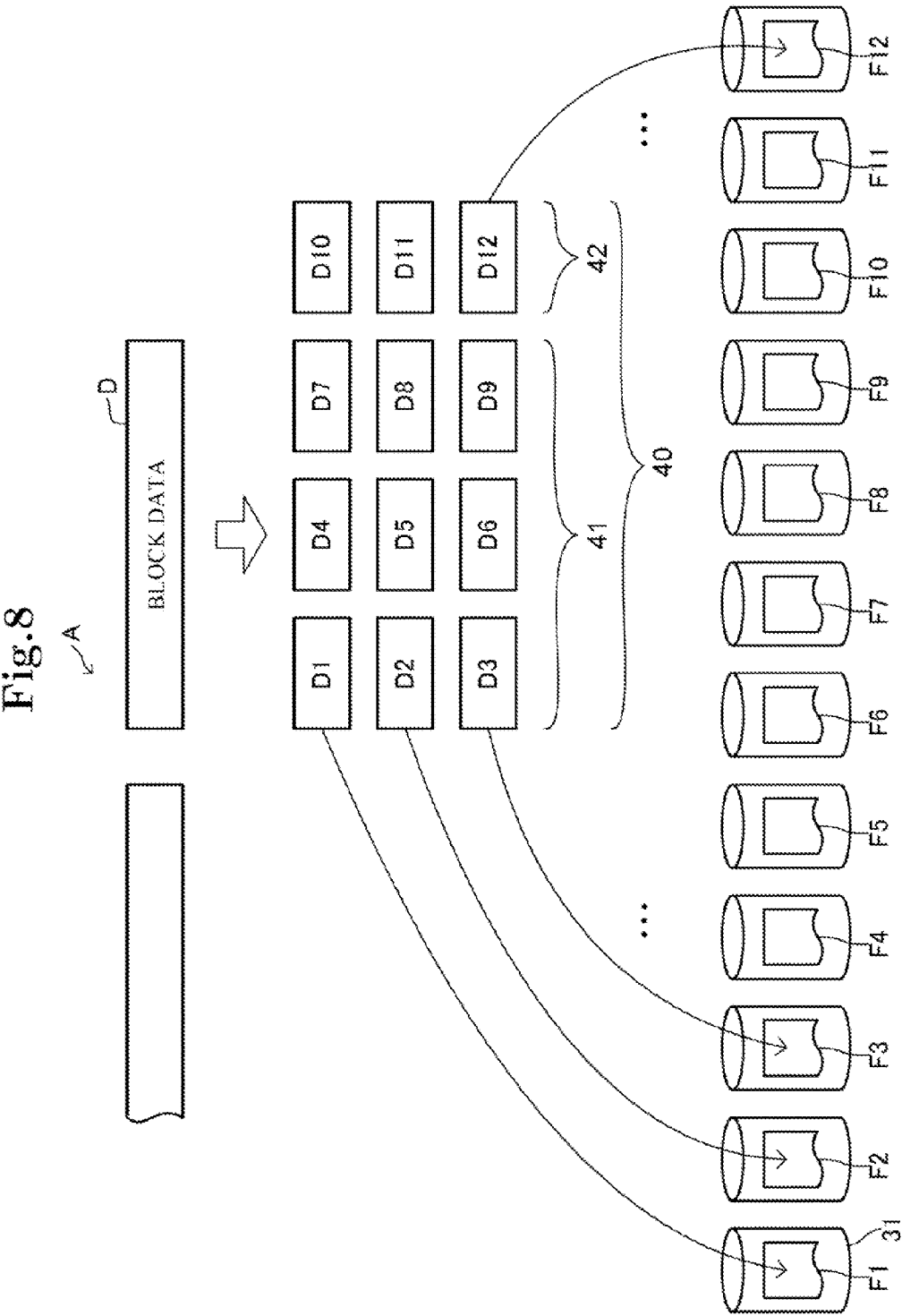
FIG. 8 is an explanation view for explaining an operation of storing data by the storage system disclosed in FIG. 7.
Figure 9:
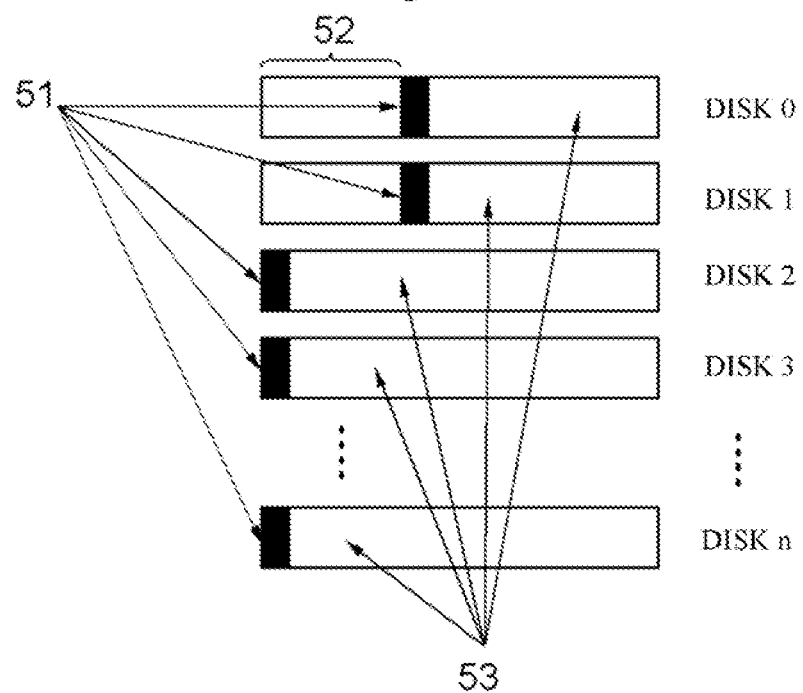
FIG. 9 is a view showing storage regions of disks included in the storage system.
Figure 11:
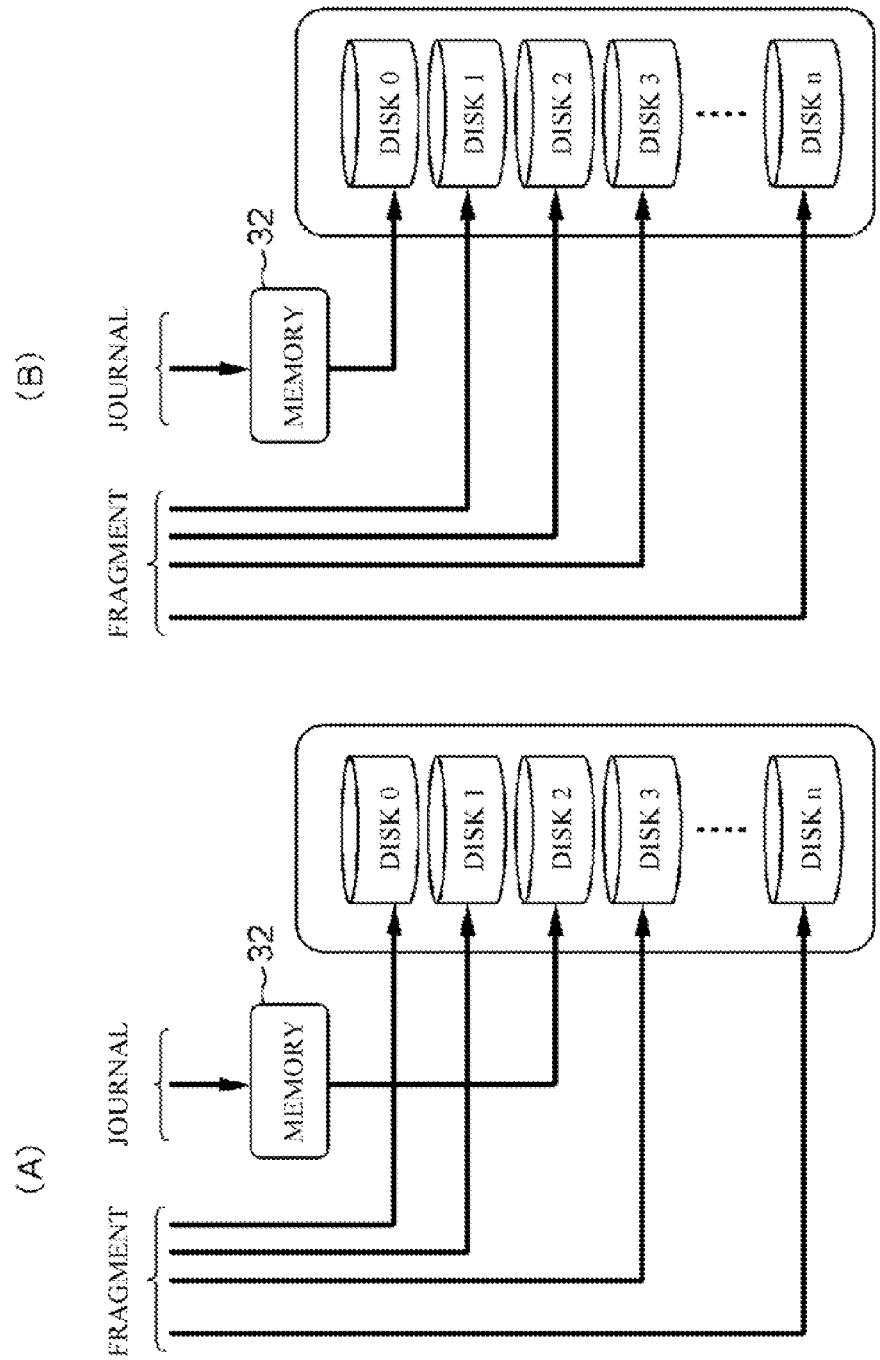
FIG. 11 is an explanation view showing an operation of storing data in the storage system.
Figure 12:
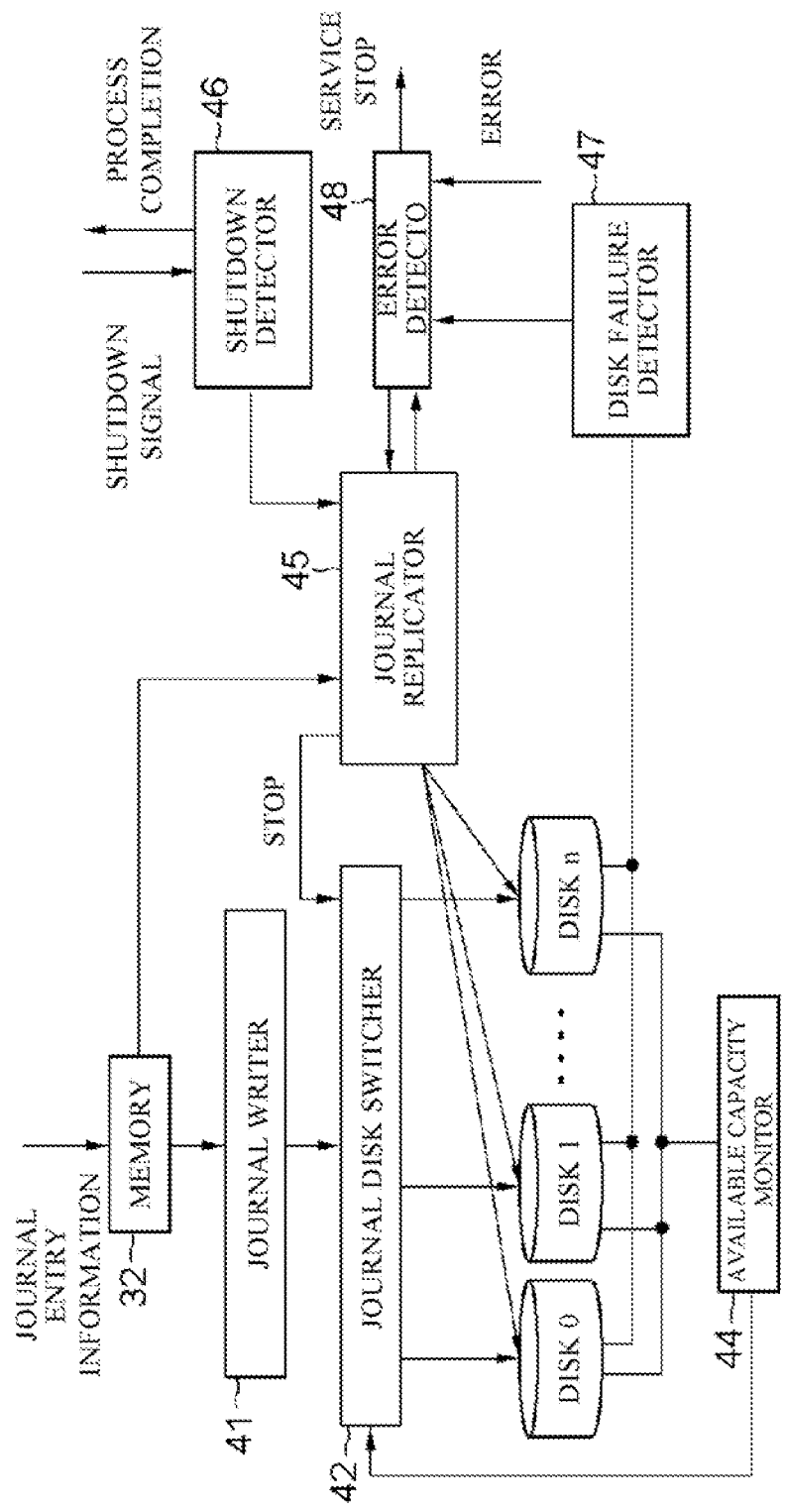
FIG. 12 is an explanation view showing an operation of storing data in the storage system.
Figure 13:
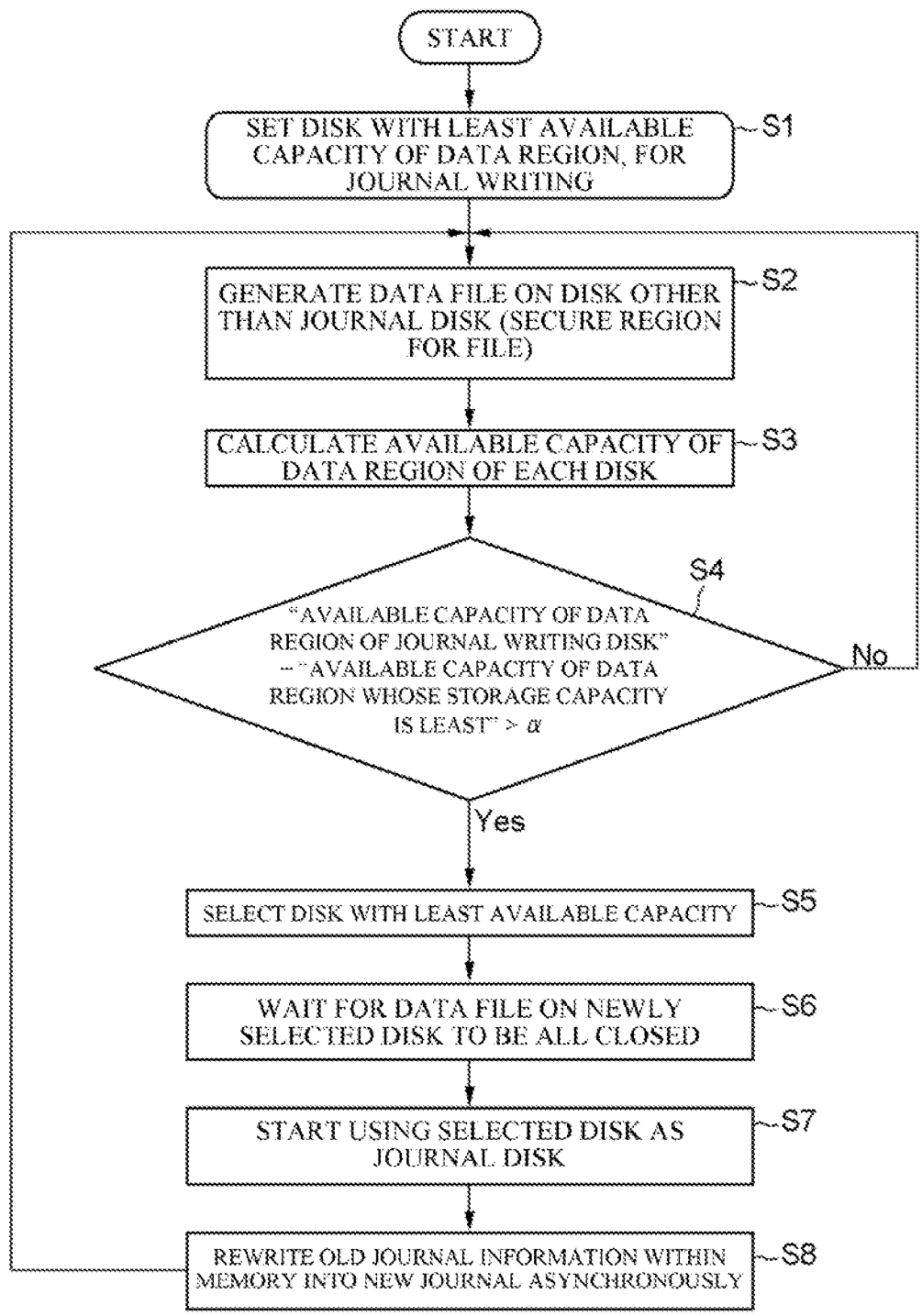
FIG. 13 is a flowchart showing an operation of the storage system.
Figure 14:
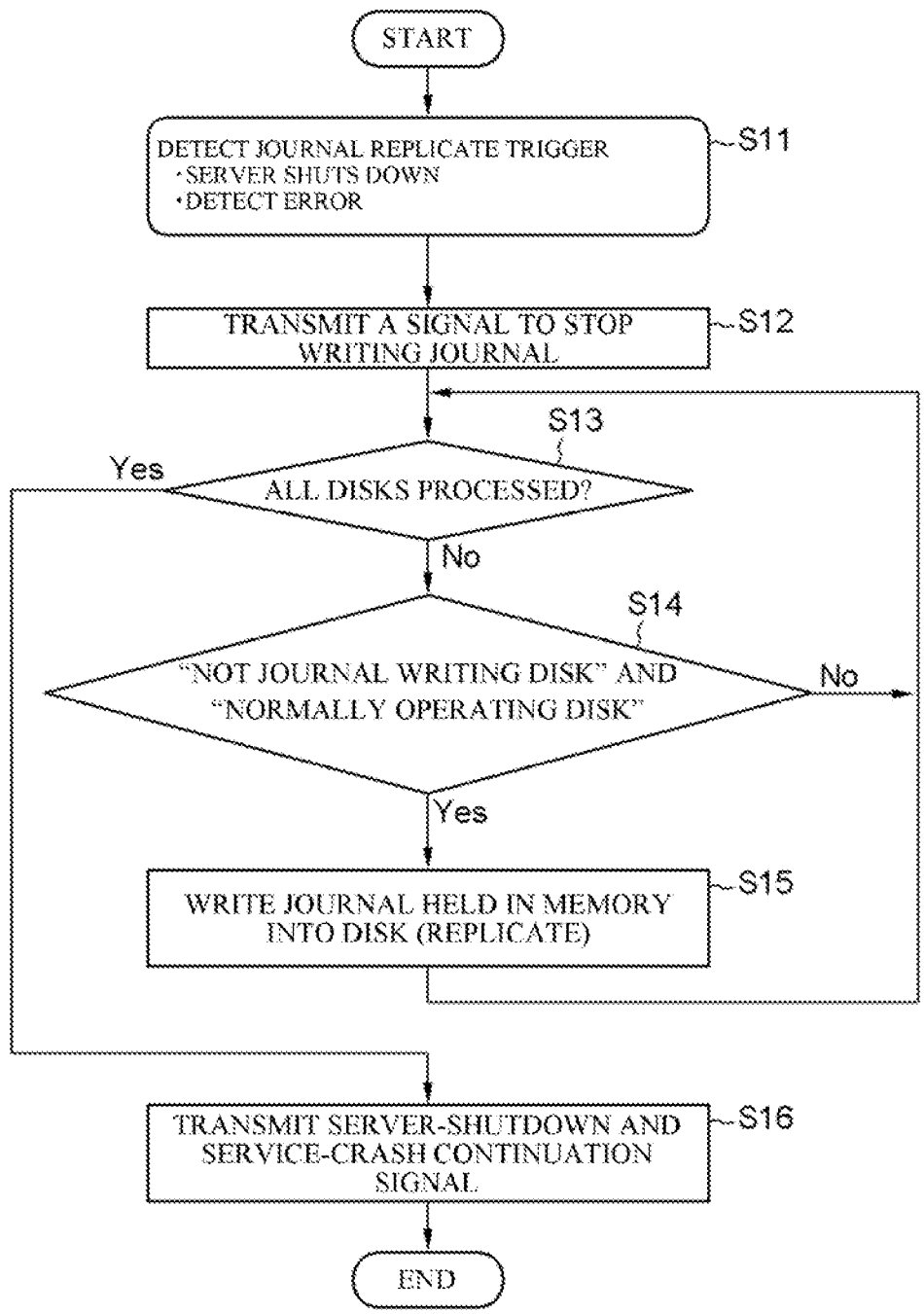
FIG. 14 is a flowchart showing an operation of the storage system.

A first exemplary embodiment of the present invention will be described with reference to FIGS. 5 to 14. FIG. 5 is a block diagram showing a configuration of a whole system. FIG. 6 is a block diagram schematically showing a storage system, and FIG. 7 is a function block diagram showing a configuration. FIG. 8 is an explanation view for explaining an operation of storing data by the storage system. FIG. 9 is a view showing storage regions of disks installed in the storage system. FIG. 10 is a view showing an example of data stored in the storage system. FIGS. 11 and 12 are explanation views showing an operation of storing data by the storage system. FIGS. 13 and 14 are flowcharts showing an operation by the storage system.

This exemplary embodiment shows a specific example of a storage system disclosed in a second exemplary embodiment described later. In a description below, the storage system is configured by connecting a plurality of server computers. However, the storage system of the present invention is not limited to being configured by a plurality of computers, and may be configured by one computer.

[Configuration]

As shown in FIG. 5, a storage system 10 of the present invention is connected to a backup system 11 that controls a backup process via a network N. The backup system 11 acquires backup target data (storage target data) stored in a backup target device 12 connected via the network N, and requests the storage system 10 to store. Thus, the storage system 10 stores the backup target data requested to be stored as a backup.

As shown in FIG. 6, the storage system 10 of this exemplary embodiment is configured by connecting a plurality of server computers. To be specific, the storage system 10 is equipped with an accelerator node 10A serving as a server computer that controls a storing/reproducing operation by the storage system 10, and a storage node 10B serving as a server computer equipped with a storage device that stores data. The number of the accelerator nodes 10A and the number of the storage nodes 10B are not limited to those shown in FIG. 6, and the storage system may be configured by connecting more nodes 10A and more nodes 10B.

Furthermore, the storage system 10 of this exemplary embodiment is a content address storage system that divides data and makes the data redundant, distributes and stores the data into a plurality of storage devices, and specifies a storing position in which the data is stored by a unique content address specified in accordance with the content of the data. A specific configuration will be described in detail.

Below, assuming the storage system 10 is one system, components and functions of the storage system 10 will be described. That is to say, the components and functions of the storage system 10 described below can be included either in the accelerator node 10A or in the storage node 10B. The storage system 10 is not limited to including the accelerator node 10A and the storage node 10B necessarily, and may have any configuration. Moreover, the storage system 10 is not limited to a content address storage system.

FIG. 7 shows a configuration of the storage system 10 of this exemplary embodiment. As shown in this drawing, the storage system 10 is equipped with a data storage device 30 that stores data, and a data processing device 20 (a data processing means) that controls operations of storing and retrieving data into and from the data storage device 30. Actually, the data processing device 20 is configured by a plurality of arithmetic devices such as a CPU (Central Processing Unit) of the accelerator node 10A and a CPU of the storage node 10B shown in FIG. 6. The storage device 30 is configured by a storage device such as a hard disk of the accelerator node 10A and a hard disk of the storage node 10B shown in FIG. 6.

As shown in FIG. 6, the data processing device 20 is equipped with a fragment generation unit 21, a distribution storage control unit 22, a journal storage control unit 23 and a storage destination setting unit 24, which are constructed by building in a program. The data storage device 30 is equipped with a plurality of storage devices 31 (storing means) such as hard disk drives and is also equipped with a volatile memory 32 that stores a journal. Below the respective components will be described in detail. The abovementioned program is provided to the storage system 10, for example, in a state stored in a storage medium such as a CD-ROM. Alternatively, the program may be stored in a storage device of another server computer on the network and provided from the other server computer to the storage system 10 via the network.

First, a basic configuration of the data processing device 20, namely, a distribution storage function by the fragment generation unit 21 and the distribution storage control unit 22 will be described with reference to FIG. 8.

First, upon acceptance of an input of backup target data A, the fragment generation unit 21 divides the backup target data A into predetermined capacities (e.g., 64 KB) of block data D. Then, the fragment generation unit 21 further divides the block data D into a plurality of fragment data having predetermined capacities. For example, as shown by reference numerals D1 to D9, the fragment generation unit 21 divides the block data into nine fragment data (division data 41). Moreover, the fragment generation unit 21 generates redundant data so that the original block data can be restored even if some of the fragment data obtained by division are lost, and adds the redundant data to the fragment data 41 obtained by division. For example, the fragment generation unit 21 adds three fragment data (redundant data 42) as shown by reference numerals D10 to D12. Thus, the fragment generation unit 21 generates a data set 40 including twelve fragment data composed of the nine division data 41 and the three redundant data.

The distribution storage control unit 24 (a distribution storage controlling means) distributes and stores the fragment data composing the data set generated as described above into respective storage regions formed in the storage devices 31. For example, in a case that the twelve fragment data D1 to D12 are generated, the distribution storage control unit 24 stores the fragment data D1 to D12 into data storage files F1 to F12 formed in the twelve storage devices 31 one by one.

Further, the distribution storage control unit 22 of this exemplary embodiment has a function of storing a journal representing the history of a data processing status within the storage system, for example, a journal representing the record of a data storing process status, a data deletion process status, and so on, into the storage devices 31. At this moment, the distribution storage control unit 22 stores the journal and the fragment data into each of the storage devices 31 set by the storage destination setting unit 24. That is to say, the distribution storage control unit 22 stores the journal into the storage device 31 set as a journal storage device, and stores respective fragment data into the storage device set as a fragment storage device.

Next, the storage destination setting unit 24 (a storage destination setting means) will be described. As mentioned above, the storage destination setting unit 24 has a function of setting the storage devices 31 to become storage destinations of a journal and fragment data stored by the distribution storage control unit 22.

In this exemplary embodiment, as shown in FIG. 9, the storage system is equipped with (n+1) pieces of disks 0 to n as the storage devices 31. Among these disks, the disks 0 and 1 have duplicated OS (Operating System) regions 52. Moreover, in this exemplary embodiment, all of the disks 0 to n each have a journal storage region 51 for storing a journal and a data region 53 for storing fragment data. That is to say, all of the disks 0 and 1 having the OS regions 52 and the other disks 2 to n each have the journal storage region 51 and the data region 53.

Under the abovementioned condition, the storage destination setting unit 24 sets one of the disks as a journal storage device, and sets all of the disks other than the disk set as the journal storage device, as fragment storage devices. To be specific, in the initial state, the storage destination setting unit 24 firstly sets a disk in which the available capacity of the data region 53 is the least, as a journal storage device. At this moment, in a case that there are a plurality of disks in which the available capacities are the least, any one of the disks is set as a journal storage device. A disk with the least available capacity is set as a journal storage device because the data amount of a journal is relatively small. Then, the storage destination setting unit 24 sets the other disks as fragment storage devices.

Upon setting of the respective disks as described above, the storage destination setting unit 24 stores data to be stored and the available capacity of the data region into a disk use information table as shown in FIG. 10 formed within the data storage device 30, by disk number. For example, in the case of setting the disk 2 as a journal storage device, the storage destination setting unit 24 stores information "for writing a journal" into the disk 2, and stores information "for writing data" into the disks set as the other fragment storage device. The data processing device 20 constantly checks the available capacities of the data regions 53 of the respective disks at fixed time intervals, and stores into the abovementioned table so as to correspond to the respective disks (D0 to Dn).

As described above, the distribution storage control unit 22 distributes and stores a journal and fragment data into the respective disks, and the available capabilities of the respective disks change. Along with change of the available capabilities, the storage destination setting unit 24 changes and sets a disk serving as a journal storage device. To be specific, based on the available capabilities of the data regions within the disk use information table constantly updated as described above, the storage destination setting unit 24 constantly checks at fixed time intervals whether the following expression is satisfied or not:

{(the available capacity of the data region of the disk set as a journal storage device)−(the available capacity of the data region of the disk with the least available capacity among the other disks)}>α (α: a preset value).

Then, at a time that the above condition is satisfied, the storage destination setting unit 24 changes to set a disk in which the available capacity of the data region 53 is the least at that moment as a new journal storage device. That is to say, the above condition expression becomes satisfied when the available capacity of the disks of fragment storage devices changes to decrease and, at a time that the condition expression is satisfied, the storage destination setting unit 24 changes to set the disk with the least available capacity as a journal storage device for storing a journal, the data amount of which is small.

Thus, the storage destination setting unit 24 changes and sets in a manner that all of the disks are subsequently set as a journal storage device. The storage destination setting unit 24 does not need to change in a manner that all of the disks are set as a journal storage device. Moreover, a time to change a journal storage device is not limited to when the above condition is satisfied. For example, at a time that another condition expression based on the available capacity of the data region of a disk set as a journal storage device and the available capacities of the other disks is satisfied, a journal storage device may be changed and set.

The journal storage control unit 23 (a journal storage controlling means) controls so as to store and hold the journal stored in the disk set as a journal storage device by the distribution storage control unit 22 as described above, also into the memory 32. Then, when a disk serving as a new journal storage device is set by the storage destination setting unit 24 as described above, the journal storage control unit 23 writes the journal held within the memory 32 into the disk serving as the new journal storage device.

Furthermore, the journal storage control unit 23 writes the journal stored in the memory 32 into a disk in accordance with an operation status of the storage system 10, for example, at the time of occurrence of a failure in the storage system 10 like occurrence of a failure of the storage device 31. At this moment, particularly, the journal storage control unit 23 stores the journal into a disk set as a fragment storage device, not into the disk set as a journal storage device.

[Operation]

Next, an operation of the storage system 1 with the abovementioned configuration (a data processing step) will be described with reference to FIGS. 11 to 14. In the initial state, a disk in which the available capacity of the data region is the least is set as a journal storage device (step S1 in FIG. 13). Then, the status of setting is stored into the disk use information table. Moreover, with reference to this table, a data file is generated on each of disks set as fragment storage devices other than the journal storage device, whereby regions for storing fragment data are secured (step S2 in FIG. 13).

After that, based on the setting of the disks mentioned above, fragment data including division data of storage target data and redundant data and a journal are stored into the disks, respectively. For example, in a case that the disk 2 is set as a journal storage device, a journal is stored into the disk 2 via the memory 32 and fragment data are distributed and stored into the other disks as shown in FIG. 11A. The memory 32 keeps holding the journal.

A process of storing a journal will be described more with reference to FIG. 12. FIG. 12 illustrates a function relating to the journal storing process constructed within the data processing device 20. As shown in this drawing, a journal is firstly stored into the memory 32, and stored in the memory 32 at all times. Then, a journal writer 41 stores the journal stored in the memory into a disk switched to a journal storage device by a journal disk switcher 42.

Subsequently, as described above, while the journal and the fragment data are distributedly stored in the respective disks, the available capacities of the data regions (refer to reference numeral 53 in FIG. 9) of the respective disks are constantly updated (step S3 in FIG. 13; an available capacity monitor 44 in FIG. 12).

Then, the abovementioned condition, namely,

{(the available capacity of the data region of the disk set as a journal storage device)−(the available capacity of the data region of the disk with the least available capacity among the other disks)}>α (α: a preset value)

is satisfied ("Yes" at step S4 in FIG. 13), the disk in which the available capacity of the data region 53 is the least at that moment is changed to and set as a new journal storage device (step S5 in FIG. 13), and the setting status of the disk is stored into the disk use information table (a storage destination setting step). In a case that there are a plurality of disks with the least available capacities, any one of the disks is set as a journal storage device.

After that, it is waited that the data file on the disk newly set as a journal storage device, namely, the region for fragment is all closed (step S6 in FIG. 13). Then, immediately after the data file of the disk newly set as a journal storage device is all closed, use of the disk as a journal storage device is started (step S7 in FIG. 13). At this moment, firstly, the journal held in the memory 32 is written in the disk of the new journal storage device (step S8 in FIG. 13). At this moment, the journal is also kept held within the memory 32. Consequently, even if a failure like crash arises while moving the journal, it is possible to recover by using the journal within the disk and the journal within the memory.

After that, in a like manner as described above, a data file is generated on each of the disks set as fragment storage devices other than the journal storage device, whereby regions for storing fragment data are secured (step S2 in FIG. 13). Then, based on the setting of the abovementioned table, the fragment data including division data of storage target data and redundant data and the journal are stored into the disks, respectively (a distribution storage controlling step). For example, when the disk 0 is set as a new journal storage device in a state shown in FIG. 11A, the journal is stored into the disk 0 via the memory 32 and the fragment data are distributedly stored into the other disks as shown in FIG. 11B. The memory 32 keeps holding the journal.

Next, an operation when a failure occurs in the storage system will be described with reference to FIG. 14. Firstly, with occurrence of an event like "Expected Error" including a shutdown of a server and a disk failure, it is detected that failure occurs in the storage system 10. Such a failure is detected by, for example, a shutdown detector 46, a disk failure detector 47 and an error detector 48 shown in FIG. 12 (step S11 in FIG. 14).

Then, upon detection of a failure of the storage system 10, a journal writing process and a journal disk switching process are stopped (step S12 in FIG. 14). After that, a process of writing the journal held in the memory 32 into the disk is executed. To be specific, the journal held in the memory 32 is written into all of the normally operating disks other than the disk set as a journal storage device ("No" at step S13, "Yes" at step S14, and step S15 in FIG. 14). The journal writing process is executed by a journal replicator 45 shown in FIG. 12.

Upon completion of the journal writing process on all of the disks that the journal is written ("Yes" at step 13 in FIG. 14), a command to stop the storage service or continue the shutdown of the storage system is given.

Thus, according to the storage system 10 of this exemplary embodiment, a journal is not fixedly stored into a specific disk, and it is possible to inhibit simultaneous loss of fragment data and a journal even if a disk failure occurs. In particular, since a journal and fragment data are never stored into one disk simultaneously, it is possible to inhibit contention of a process of writing data into the disk. As a result, it is possible to realize increase of writing performance while realizing increase of redundancy of stored data. Then, by sequentially changing and setting a disk for storing a journal, it is possible to efficiently store a journal, the data capacity of which is relatively small.

Further, since a journal is held in the memory as well as stored in a disk, redundancy is secured. Furthermore, for example, in case of a failure of the storage system, it is possible to realize further increase of redundancy by storing the journal into any disk.

Second Exemplary Embodiment

Figure 15:
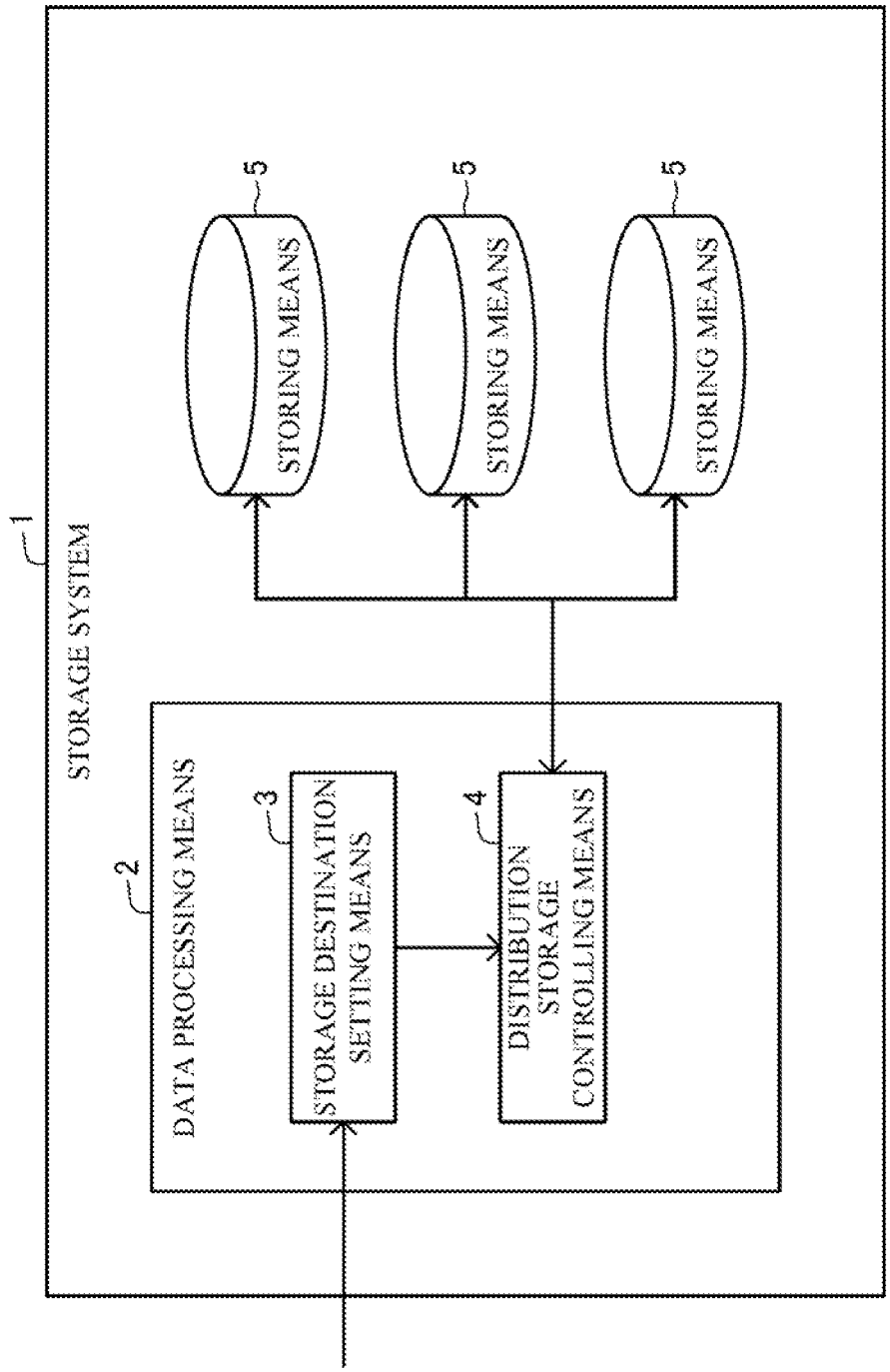
FIG. 15 is a function block diagram showing a configuration of a storage system in a second exemplary embodiment of the present invention.

A second exemplary embodiment of the present invention will be described with reference to FIG. 15. FIG. 15 is a function block diagram showing a configuration of a storage system. In this exemplary embodiment, the storage system will be schematically described.

As shown in FIG. 15, a storage system 1 of this exemplary embodiment includes a plurality of storing means 5 and a data processing means 2 configured to store data into the plurality of storing means 5.

Then, the data processing means 2 includes: a storage destination setting means 3 configured to set a journal storing means configured to store a journal showing a data processing status of the storage system from among the plurality of storing means 5, and set the plurality of storing means other than the set journal storing means as fragment storing means configured to distributedly store a plurality of fragment data forming storage target data, respectively; and a distribution storage controlling means 4 configured to store the journal into the storing means 5 set as the journal storing means by the storage destination setting means 3, and distribute and store the plurality of fragment data into the plurality of storing means 5 set as the fragment storing means, respectively.

According to the storage system with the configuration described above, the journal storing means configured to store a journal and the fragment storing means configured to store respective fragment data forming storage target data are set so as not to coincide. Therefore, a journal is not fixedly stored into a specific storing means, and it is possible to inhibit simultaneous loss of fragment data and a journal even if a failure occurs in the storing means. Moreover, since a journal and fragment data are never stored into one storing means, it is possible to inhibit contention of a process of writing data into the storing means. As a result, it is possible to realize increase of writing performance while realizing increase of redundancy of stored data.

Further, in the storage system, the storage destination setting means is configured to set the journal storing means by subsequently changing to the other storing means. Further, in the storage system, the storage destination setting means is configured to set the journal storing means by subsequently changing among all of the storing means.

Further, in the storage system, the storage destination setting means is configured to set the journal storing means by changing at a time based on change of a value of an available capacity of the storing means set as the journal storing means and values of available capacities of the other storing means. For example, the storage destination setting means is configured to set the journal storing means by changing at a time that {(the available capacity of the storing means set as the journal storing means)−(a available capacity of a storing means with least available capacity among the other storing means)}>α (α: a preset value) is satisfied.

Further, in the storage system, the storage destination setting means is configured to set the storing means with the least available capacity as the journal storing means.

By thus sequentially changing and setting a region for storing a journal, it is possible to efficiently store a journal, the data capacity of which is relatively small.

Further, in the storage system, the journal is stored into the storing means by the distribution storage controlling means, and the storage system includes a journal storage controlling means configured to store the journal into a volatile memory installed in the storage system.

Then, in the storage system, the journal storage controlling means is configured to, when the journal storing means is changed and set by the storage destination setting means, store the journal stored in the volatile memory into the storing means newly set as the journal storing means by changing.

Furthermore, in the storage system, the journal storage controlling means is configured to store the journal stored in the volatile memory into the storing means set as the fragment storing means in accordance with an operation status of the storage system. In this case, for example, the journal storage controlling means is configured to, at the time of occurrence of a failure of the storage system, store the journal stored in the volatile memory into all of the storing means set as the fragment storing means, respectively.

Consequently, it is possible to keep a journal stored in any storing means in case of a failure of the storage system. Therefore, even if a failure occurs in the journal storing means, the journal is held in the other storing means, and it is possible to recover later with reference to the journal. As a result, it is possible to further increase redundancy.

Further, the abovementioned storage system can be realized by installing a program into an information processing device.

To be specific, a computer program of another embodiment of the present invention is a program including instructions for causing an information processing device equipped with a plurality of storing means to realize a data processing means configured to store data into the plurality of storing means.

Then, the data processing means includes: a storage destination setting means configured to set a journal storing means configured to store a journal showing a data processing status of the storage system from among the plurality of storing means, and set the plurality of storing means other than the set journal storing means as fragment storing means configured to distributedly store a plurality of fragment data forming storage target data, respectively; and a distribution storage controlling means configured to store the journal into the storing means set as the journal storing means by the storage destination setting means, and distribute and store the plurality of fragment data into the plurality of storing means set as the fragment storing means, respectively.

Further, in the computer program, the storage destination setting means is configured to set the journal storing means by subsequently changing to the other storing means.

Further, a data processing method of another embodiment of the present invention realized by operation of the abovementioned storage system includes, when a storage system equipped with a plurality of storing means stores data into the plurality of storing means: setting a journal storing means configured to store a journal showing a data processing status of the storage system from among the plurality of storing means, and setting the plurality of storing means other than the set journal storing means as fragment storing means configured to distributedly store a plurality of fragment data forming storage target data, respectively; and storing the journal into the storing means set as the journal storing means, and distributing and storing the plurality of fragment data into the plurality of storing means set as the fragment storing means, respectively.

Then, the data processing method includes, at the time of setting the journal storing means from among the plurality of storing means, setting the journal storing means by subsequently changing to the other storing means.

Inventions of a computer program and a data processing method having the abovementioned configurations have like actions as the abovementioned storage system, and therefore, can achieve the object of the present invention mentioned above.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

The present invention is based upon and claims the benefit of priority from Japanese patent application No. 2009-032335, filed on Feb. 16, 2009, the disclosure of which is incorporated herein in its entirety by reference.

INDUSTRIAL APPLICABILITY

The present invention can be utilized for a storage system configured by connecting a plurality of computers, and has industrial applicability.

DESCRIPTION OF REFERENCE NUMERALS 1 storage system
2 data processing means
3 storage destination setting means
4 distribution storage controlling means
5 storing means
10 storage system
10A accelerator node
10B storage node
11 backup system
12 backup device
21 fragment generation unit
22 distribution storage control unit
23 journal storage control unit
24 storage destination setting unit
31 storage device
32 memory

The invention claimed is:

1. A storage system comprising a plurality of storing units and a data processing unit configured to store data into the plurality of storing units, wherein:
the data processing unit includes:
a storage destination setting unit configured to set one of the plurality of storing unit as a journal storing unit configured to store a journal showing a data processing status of the storage system, and set the plurality of storing units other than the storing unit, on which the journal storing unit is set, as fragment storing units configured to distributedly store a plurality of fragment data forming storage target data, respectively; and
a distribution storage controlling unit configured to store the journal into the storing unit set as the journal storing unit by the storage destination setting unit, and distribute and store the plurality of fragment data into the plurality of storing units set as the fragment storing units, respectively,
wherein the storage destination setting unit is configured to set the storing unit, on which the journal storing unit is set, so as to be changed into the other storing units subsequently based on change of a value of an available capacity of the storing unit set as the journal storing unit and values of available capacities of the other storing units.

2. The storage system according to claim 1, wherein the storage destination setting unit is configured to set the journal storing unit by changing at a time that $$\{(\text{the available capacity of the storing unit set as the journal storing unit})-(\text{a available capacity of a storing unit with least available capacity among the other storing units})\} > \alpha \text{ } (\alpha\text{: a preset value})$$

is satisfied.

3. A storage system comprising a plurality of storing units and a data processing unit configured to store data into the plurality of storing units, wherein:
the data processing unit includes:
a storage destination setting unit configured to set one of the plurality of storing unit as a journal storing unit configured to store a journal showing a data processing status of the storage system, and set the plurality of storing units other than the storing unit, on which the journal storing unit is set, as fragment storing units configured to distributedly store a plurality of fragment data generated from data to be storage target data, respectively; and
a distribution storage controlling unit configured to store the journal into the storing unit set as the journal storing unit by the storage destination setting unit, and distribute and store the plurality of fragment data into the plurality of storing units set as the fragment storing units, respectively, wherein the storage destination setting unit is configured to set the storing unit with the least available capacity among the other storing units as the journal storing unit.

4. A storage system comprising a plurality of storing units and a data processing unit configured to store data into the plurality of storing units, wherein:
the data processing unit includes:
a storage destination setting unit configured to set one of the plurality of storing unit as a journal storing unit configured to store a journal showing a data processing status of the storage system, and set the plurality of storing units other than the storing unit, on which the journal storing unit is set, as fragment storing units configured to distributedly store a plurality of fragment data generated from data to be storage target data, respectively; and
a distribution storage controlling unit configured to store the journal into the storing unit set as the journal storing unit by the storage destination setting unit, and distribute and store the plurality of fragment data into the plurality of storing units set as the fragment storing units, respectively, and
wherein
the journal storage controlling unit is configured to store the journal stored in the storage unit into a volatile memory installed in the storage system and the journal storage controlling unit is configured to store the journal stored in the volatile memory into the storing unit set as the fragment storing unit in accordance with an operation status of the storage system.

5. The storage system according to claim 4, wherein the journal storage controlling unit is configured to, when the journal storing unit is subsequently changed and set by the storage destination setting unit, store the journal stored in the volatile memory by the journal storing controlling unit into the storing unit newly set as the journal storing unit by the changing.

6. The storage system according to claim 4, wherein the journal storage controlling unit is configured to, at the time of occurrence of a failure of the storage system, store the journal stored in the volatile memory into all of the storing units set as the fragment storing units, respectively.

7. A non-transitory computer-readable storage medium that stores a program comprising instructions for causing an information processing device equipped with a plurality of storing units to realize a data processing unit configured to store data into the plurality of storing units, wherein:

the data processing unit includes:
  a storage destination setting unit configured to set one of plurality of storing unit as a journal storing unit configured to store a journal showing a data processing status of the storage system, and set the plurality of storing units other than the storing unit, on which the journal storing unit is set, as fragment storing units configured to distributedly store a plurality of fragment data generated from data to be storage target data respectively; and
  a distribution storage controlling unit configured to store the journal into the storing unit set as the journal storing unit by the storage destination setting unit, and distribute and store the plurality of fragment data into the plurality of storing units set as the fragment storing units, respectively, and the storage destination setting unit is configured to set the storing unit, on which the journal storing unit is set, so as to be changed into the other storing units subsequently based on change of a value of an available capacity of the storing unit set as the journal storing unit and values of available capacities of the other storing units.

8. A data processing method comprising, when a storage system equipped with a plurality of storing units stores data into the plurality of storing units:

setting one of the plurality of storing unit as a journal storing unit configured to store a journal showing a data processing status of the storage system, and setting the plurality of storing units other than the storing unit on which the journal storing unit is set as fragment storing units configured to distributedly store a plurality of fragment data generated from data to be storage target data respectively; and storing the journal into the storing unit set as the journal storing unit, and distributing and storing the plurality of fragment data into the plurality of storing units set as the fragment storing units, respectively, and at the time of setting the journal storing unit which is one of the plurality of storing units, setting the storing unit, on which the journal storing unit is set, so as to be changed into the other storing units subsequently based on change of a value of an available capacity of the storing unit set as the journal storing unit and values of available capacities of the other storing units.

* * * * *